United States Patent [19]

Shima et al.

[11] Patent Number: 5,568,454
[45] Date of Patent: Oct. 22, 1996

[54] APPARATUS AND METHOD FOR DETECTING A DEFECT ON A MAGNETO-OPTICAL DISK

[75] Inventors: Yasuji Shima, Yokohama; Tetsuji Iwashita, Ayase, both of Japan

[73] Assignee: Tosoh Corporation, Shinnanyo, Japan

[21] Appl. No.: 396,091

[22] Filed: Feb. 28, 1995

Related U.S. Application Data

[60] Continuation of Ser. No. 92,495, Jul. 16, 1993, abandoned, which is a division of Ser. No. 869,831, Apr. 16, 1992, Pat. No. 5,270,879, and a continuation of Ser. No. 490,291, Mar. 8, 1990, abandoned.

[30] Foreign Application Priority Data

Mar. 9, 1989 [JP] Japan ........................................... 1-56898

[51] Int. Cl.$^6$ ............................... G11B 11/00; G11B 3/90
[52] U.S. Cl. ............................. 369/13; 369/54; 369/44.32
[58] Field of Search .................. 360/59, 114; 369/44.31, 369/44.32, 44.33, 54, 58, 13, 44.37, 44.38, 110, 32, 47, 48, 14

[56] References Cited

U.S. PATENT DOCUMENTS

| | | | |
|---|---|---|---|
| 4,740,942 | 4/1988 | Ogino et al. | 369/53 |
| 4,871,903 | 10/1989 | Carrell | 369/32 |
| 4,926,408 | 5/1990 | Murakami et al. | 369/58 |
| 4,972,396 | 11/1990 | Rafner | 369/44.37 |
| 5,111,345 | 5/1992 | Muller | 369/32 |

FOREIGN PATENT DOCUMENTS

| | | |
|---|---|---|
| 273384 | 7/1988 | European Pat. Off. . |
| 327033 | 8/1989 | European Pat. Off. . |
| 62-292293 | 4/1987 | Japan . |
| 62-141601 | 6/1987 | Japan . |
| 1151074 | 6/1989 | Japan . |

*Primary Examiner*—Georgia Y. Epps
*Assistant Examiner*—Tan Dinh
*Attorney, Agent, or Firm*—Oblon, Spivak, McClelland, Maier & Neustadt, P.C.

[57] ABSTRACT

A magneto-optical disk inspecting apparatus in which n pairs of a write head and a read head, and an area of the magneto-optical disk to be inspected are divided into n zones, the respective n pairs being assigned to the respective n zones so that the respective read heads read the data written in the magneto-optical disk by the respective write heads, such that characteristics of the magneto-optical disk can be inspected. An inspection is conducted by n pairs of a write head and a read head assigned to n zones of the area of a magneto-optical disk to be inspected, such that the inspection time can be shortened.

5 Claims, 10 Drawing Sheets

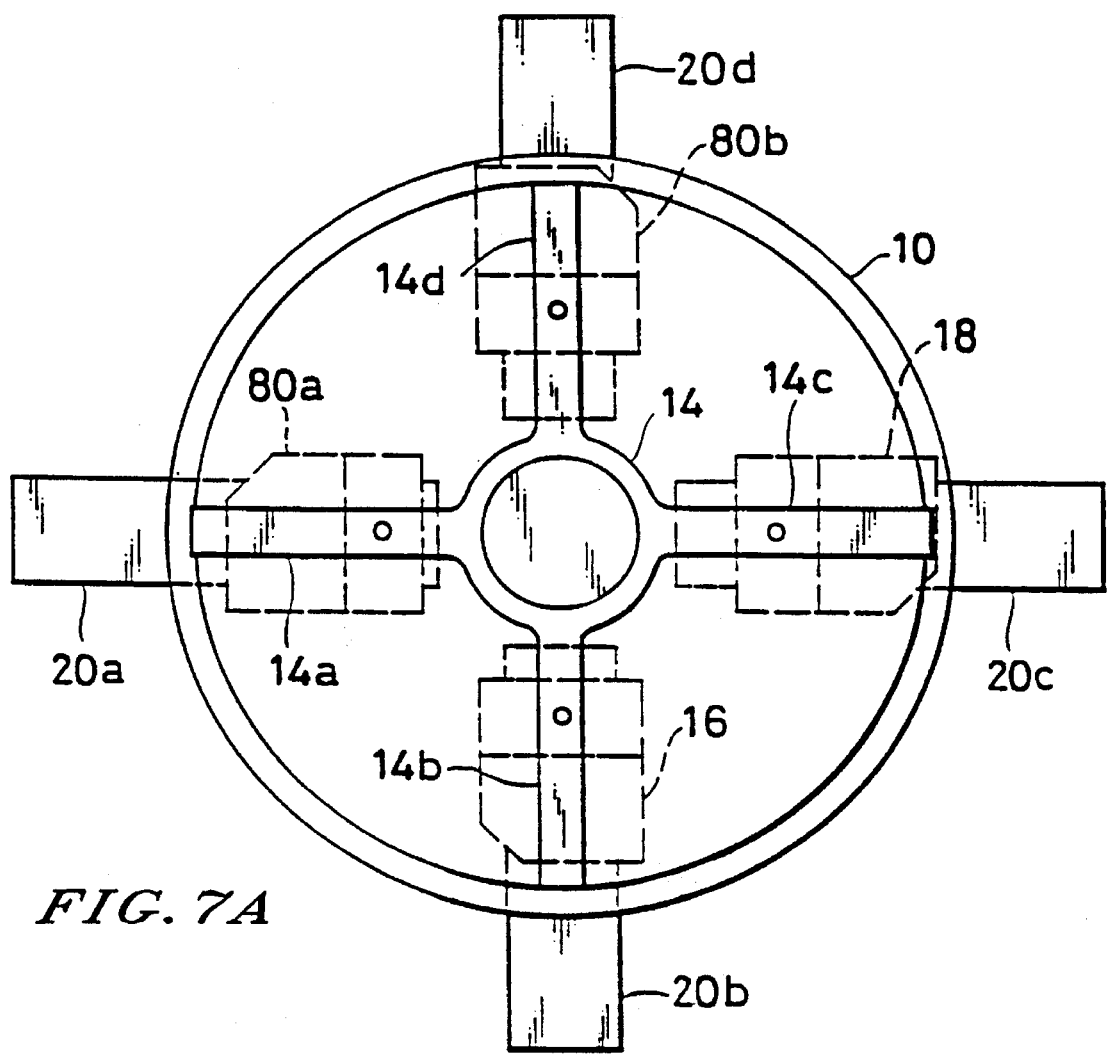
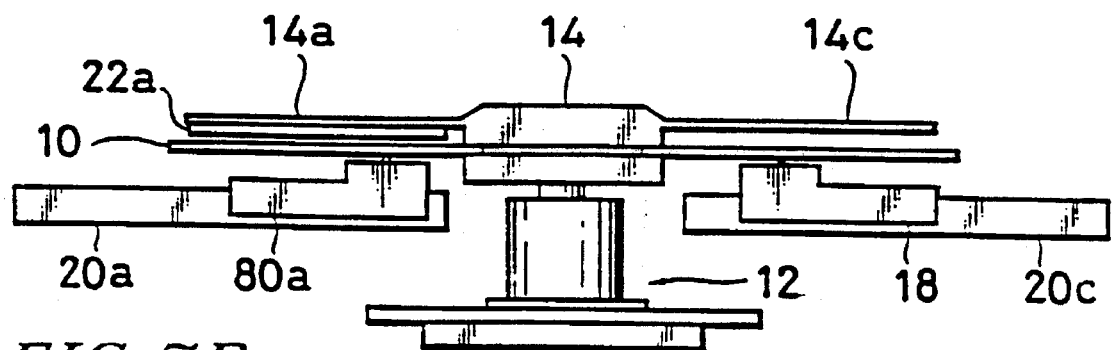

1

APPARATUS AND METHOD FOR DETECTING A DEFECT ON A MAGNETO-OPTICAL DISK

This application is a continuation of application Ser. No. 08/092,495, filed on Jul. 16, 1993 and now abandoned, which is a divisional of application Ser. No. 07/869,831 filed on Apr. 16, 1992 and now U.S. Pat. No 5,270,879 which is a continuation of application Ser. No. 07/490,291, filed on Mar. 8, 1990, now abandoned.

BACKGROUND OF THE INVENTION

This invention relates to a magneto-optical disk inspecting method and apparatus for inspecting the characteristics of a magneto-optical disk.

Many products of the magneto-optical disk, which is erasable, have been marketed, and the magneto-optical disk technique has left the trial production stage and entered the production stage. Accompanying such Growth of the magneto-optical disk products, mass supply of the magneto-optical disk as a medium has been needed.

The magneto-optical disk has been noted as a memory device of computer systems which takes place of the magnetic disk, floppy disk or others. To this end, the magneto-optical disk must have a long life and high reliability. It is necessary to inspect the magneto-optical disk when delivered.

Conventionally the magneto-optical disk has been inspected by the magneto-optical disk evaluating apparatus for evaluating various characteristics of the magneto-optical disk. This magneto-optical disk evaluating apparatus is originally for objective evaluation of specifications of the magneto-optical disk in setting them. The inspection covers a wide variety of items and is detailed.

Thus, the conventional magneto-optical disk evaluating apparatus inspects mass produced magneto-optical disks with respect to a number of inspection items including unnecessary items for their delivery inspection. The delivery inspection takes an accordingly long time, and the device must be large sized and expensive. Thus the conventional magneto-optical disk inspecting apparatus is not suitable for inspecting mass produced magneto-optical disks.

SUMMARY OF THE INVENTION

An object of this invention is to provide a magneto-optical disk inspecting method and apparatus which can efficiently inspect a large number of magneto-optical disks.

The object can be achieved by a magneto-optical disk inspecting apparatus for inspecting characteristics of a magneto-optical disk comprising: n pairs of a write head and a read head; and n zones in which is divided the area of the magneto-optical disk to be inspected, the respective pairs of a write head and a read head being assigned to the respective zones, the data written in the magneto-optical disk by the write heads being read by the read heads, whereby the magneto-optical disk is inspected.

The object can be achieved by a magneto-optical disk inspecting apparatus for inspecting characteristics of a magneto-optical disk comprising: at least one pair of a write head, a read head, a first erase head and a second erase head; the first erase head initializing the magneto-optical disk for an inspection; the write head writing inspecting data in the initialized magneto-optical disk; the read head reading for the inspection the inspection data written in the magneto-optical disk; and the second erase head initializing the magneto-optical disk with the inspection data written in.

According to this invention, there are provided n pairs of a write head and a read head, and the recording surface of a magneto-optical disk is divided in n zones to be inspected. The inspection time can be shortened.

Further according to this invention, In addition to the write and the read heads, there are provided two erase heads, and initialization, inspection and initialization of a magneto-optical disk can be conducted in a string of continuous operations. The inspection of the magneto-optical disk can be made efficient.

BRIEF DESCRIPTION OF THE DRAWINGS

FIG. 7 is a view of a major part of the magneto-optical disk inspecting apparatus according to a second embodiment of this invention;

FIG. 7(b) is a sectional view of a major part of the magneto-optical disk inspecting apparatus according to a second embodiment of this invention;

DETAILED DESCRIPTION OF THE INVENTION

Figure 1A:
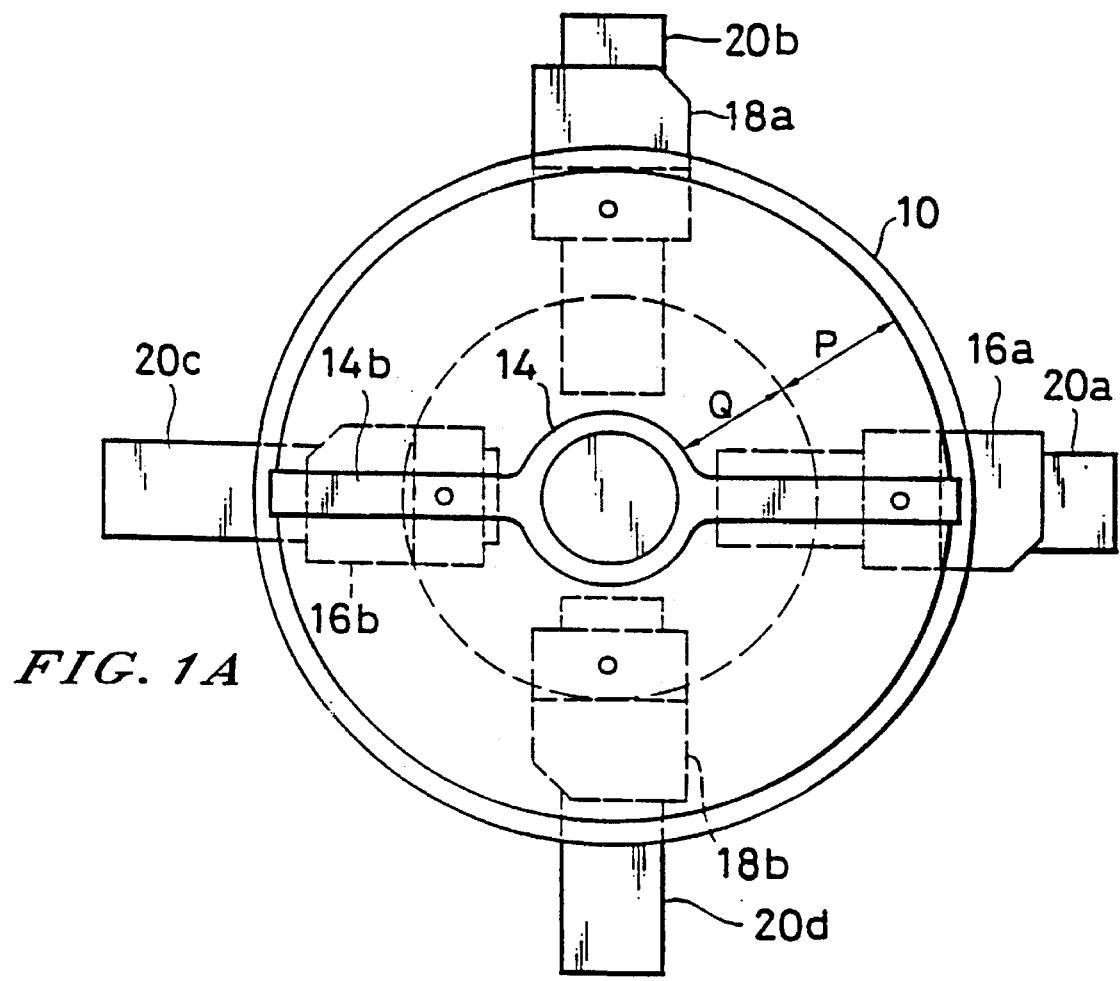
FIG. 1(a) is a plane view of a major part of the magneto-optical disk inspecting apparatus according to the first embodiment of this invention.
Figure 1B:
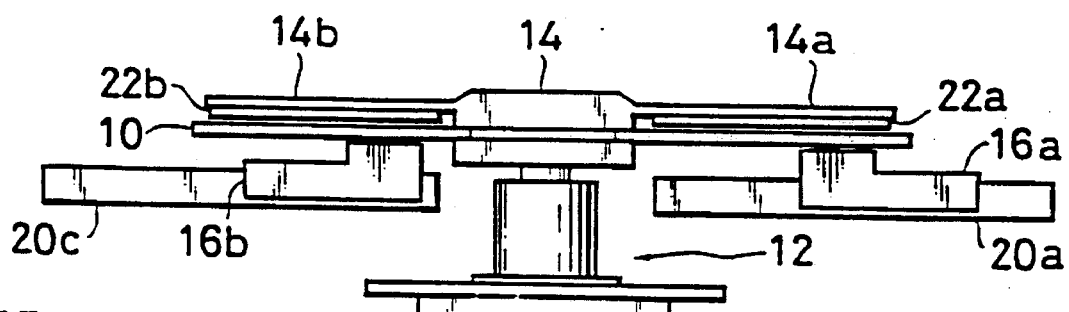
FIG. 1(b) is a sectional view of a major part of the magneto-optical disk inspecting apparatus according to the first embodiment of this invention.

The magneto-optical disk inspecting apparatus according to first embodiment of this invention will be explained below with reference to FIGS. 1–6. FIG. 1(a) and (b) are a plane view and a sectional view of a major part of the magneto-optical disk inspecting apparatus according to first embodiment of this invention.

A magneto-optical disk 10 to be inspected is mounted on the spindle of a spindle motor 12 and is fixed at the top by a clamper 14. Below the underside of the magneto-optical disk 10 there are provided four heads 16a, 16b, 18a, 18b. The heads 16a, 16b are write heads for writing only. The heads 18a, 18b are read heads for reading only. The write head 16a and the read head 18a are a pair, the write head 16b and the read head 18b being a pair. This is a characteristic feature of this embodiment.

The heads 16a, 16b, 18a, 18b have their respective linear motors 20a–20d for driving the associated heads 16a, 16b, 18a, 18b linearly in the diametric direction of the magneto-optical disk 10.

Magnetic field applying means for the magneto-optical disk 10 are in the form of elongate permanent magnets 22a, 22b attached to magnet supporting portions 14a, 14b extended radially from the center of the clamper 14, opposed to the write heads 16a, 16b across the magneto-optical disk 10. The magneto-optical disk inspecting apparatus does not require to change the direction of the magnetic field upon writing inspection data, as the usual magneto-optical disk apparatus does, and accordingly can use permanent magnets.

An inspection zone of the magneto-optical disk 10 is assigned to each pair of the heads. In this embodiment, an outer inspection zone P of the magneto-optical disk 10 is assigned to the pair of the write head 16a and the read head 18a. An inner inspection zone Q of the magneto-optical disk 10 is assigned to the pair of the write head 16b and the read head 18b. The inspection into the zone P by the pair of the write head 16a and the read head 18a, and that on the zone Q by the pair of the write head 16b and the read head 18b can be conducted concurrently, and an inspection time can be shortened by half.

The write heads 16 and the read heads 18 are detailed in FIG. 2.

Figure 2A:
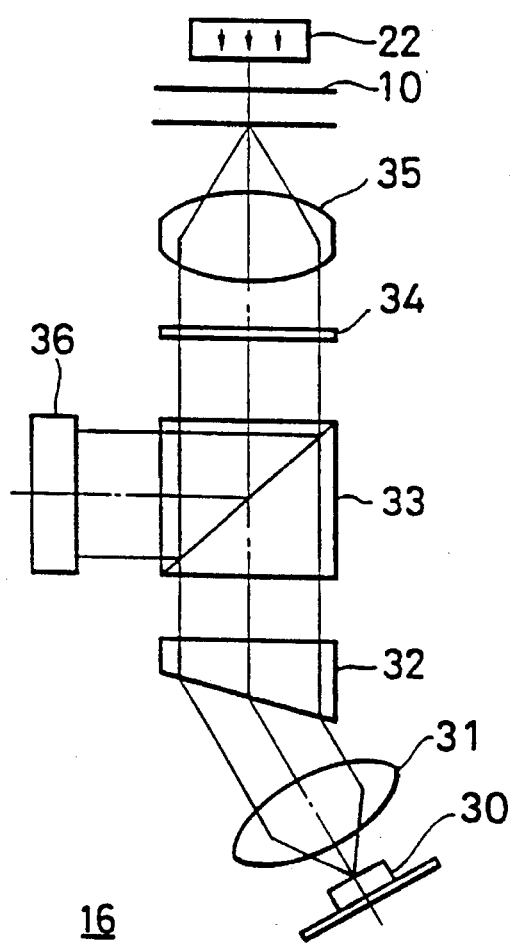
FIG. 2(a) is a view of the write head of the magneto-optical disk inspecting apparatus of FIG. 1.

FIG. 2(a) shows the write heads 16 for writing only. A laser beam emitted from a laser beam source 30 is formed into parallel beams by a collimator lens The parallel laser beams through the collimator lens 31 are shaped by a shaping prism 32. The shaped beams are incident on an objective lens 35 through a polarized beam splitter 33 and a ¼ wavelength plate 34 which constitute a beam isolator. This beam isolator prevents the beam reflected on the magneto-optical disk 10 from returning to the laser beam source 30. The objective lens 35 is driven to follow a motion of the magneto-optical disk 10 so that the laser beam is focussed on a track of the magneto-optical disk 10. The intensity of the laser beam is detected by a light detector 36 which detects the laser beam reflected by the polarized beam splitter 33 to be detected by the light detector 36.

The write heads 16, which are for writing only, do not have to read the magnetically recorded data but have to read the pre-pitted format. The write heads of this embodiment may have relatively simple structure as shown.

The writing operation is conducted by applying a magnetic field to the magneto-optical disk 10 by the permanent magnets 22, while irradiating the laser beam to heat the magneto-optical disk 10, so as to invert the magnetizing direction.

Figure 2B:
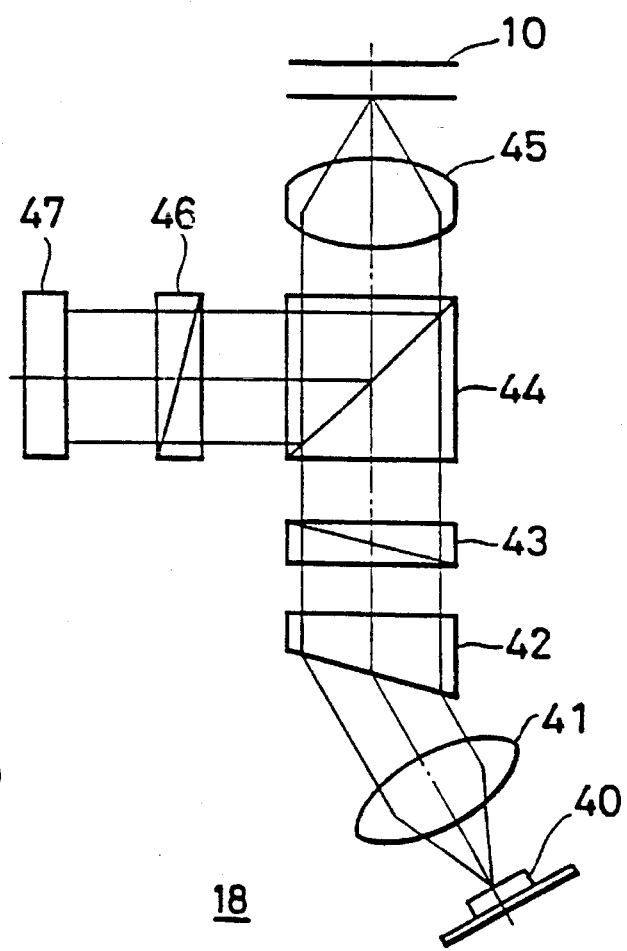
FIG. 2(b) is a view of the read head of the magneto-optical disk inspecting apparatus of FIG. 1.

FIG. 2(b) shows the read heads 18 for reading only. A laser beam emitted from a laser beam source 40 is formed into parallel beams by a collimator lens 41 and shaped by a shaping prism 42. The shaped laser beams are linearly polarized by a polarizer 43 to be incident on an objective lens 45 through a polarized beam splitter 44 which has, e.g. the transparency of the p wave Tp=0.7, and the reflectance of the s wave Rs=1.0. The objective lens 45 is driven to follow a motion the magneto-optical disk 10 so that the laser beam is focussed on a track of the magneto-optical disk 10. The reflected laser beam the plane of polarization of which has been rotated by the magnetic Kerr effect in accordance with a direction of magnetization of the magneto-optical disk 10 is reflected on the polarized beam splitter 44 to be incident on an analyser 46 and on a light detector 47 in accordance with an angle of the rotation of the polarization plane due to the magnetic Kerr effect. Based on an output of the light detector 47, a direction of magnetization of the magneto-optical disk 10 is detected.

It is not necessary to heat the read heads 18, which are for reading only, so much that the magnetic field can be inverted. The laser beam source 40 for the read heads of this embodiment may be of small power.

Figure 3:
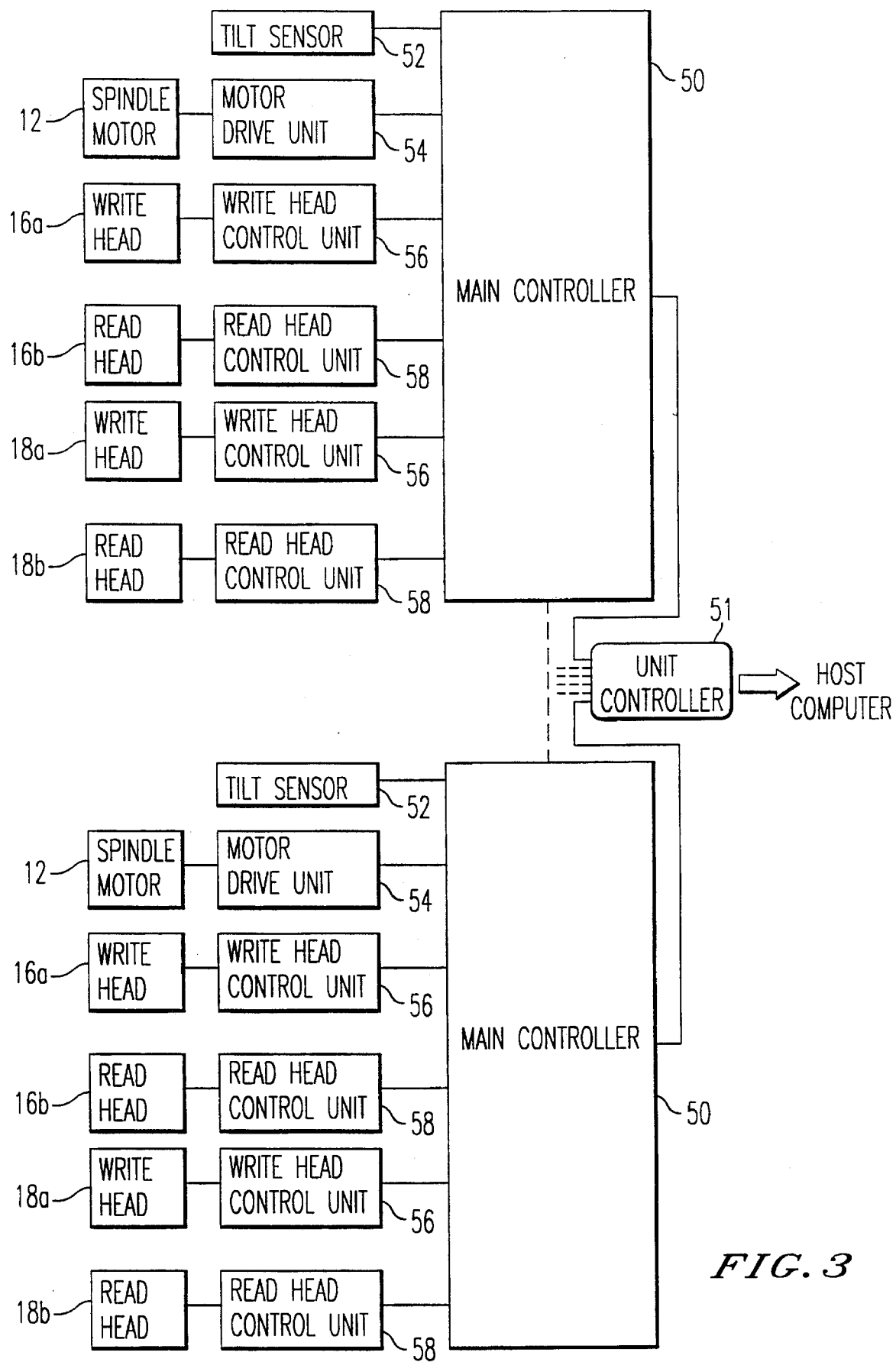
FIG. 3 is a functional block diagram of the magneto-optical disk inspecting apparatus of FIG. 1.
Figure 4:
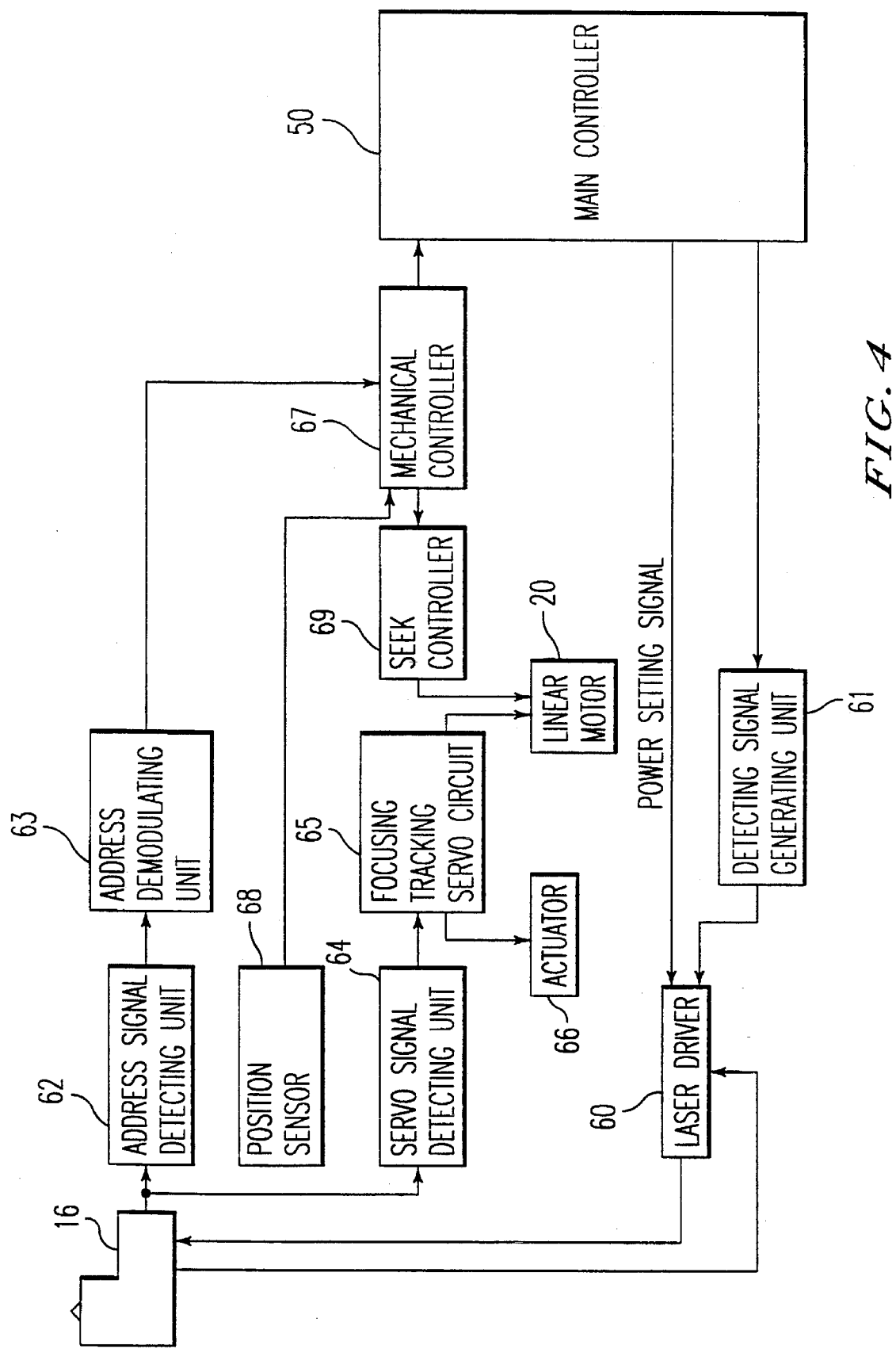
FIG. 4 is a functional block diagram of the write head control unit of the magneto-optical disk inspecting apparatus of FIG. 1.
Figure 5:
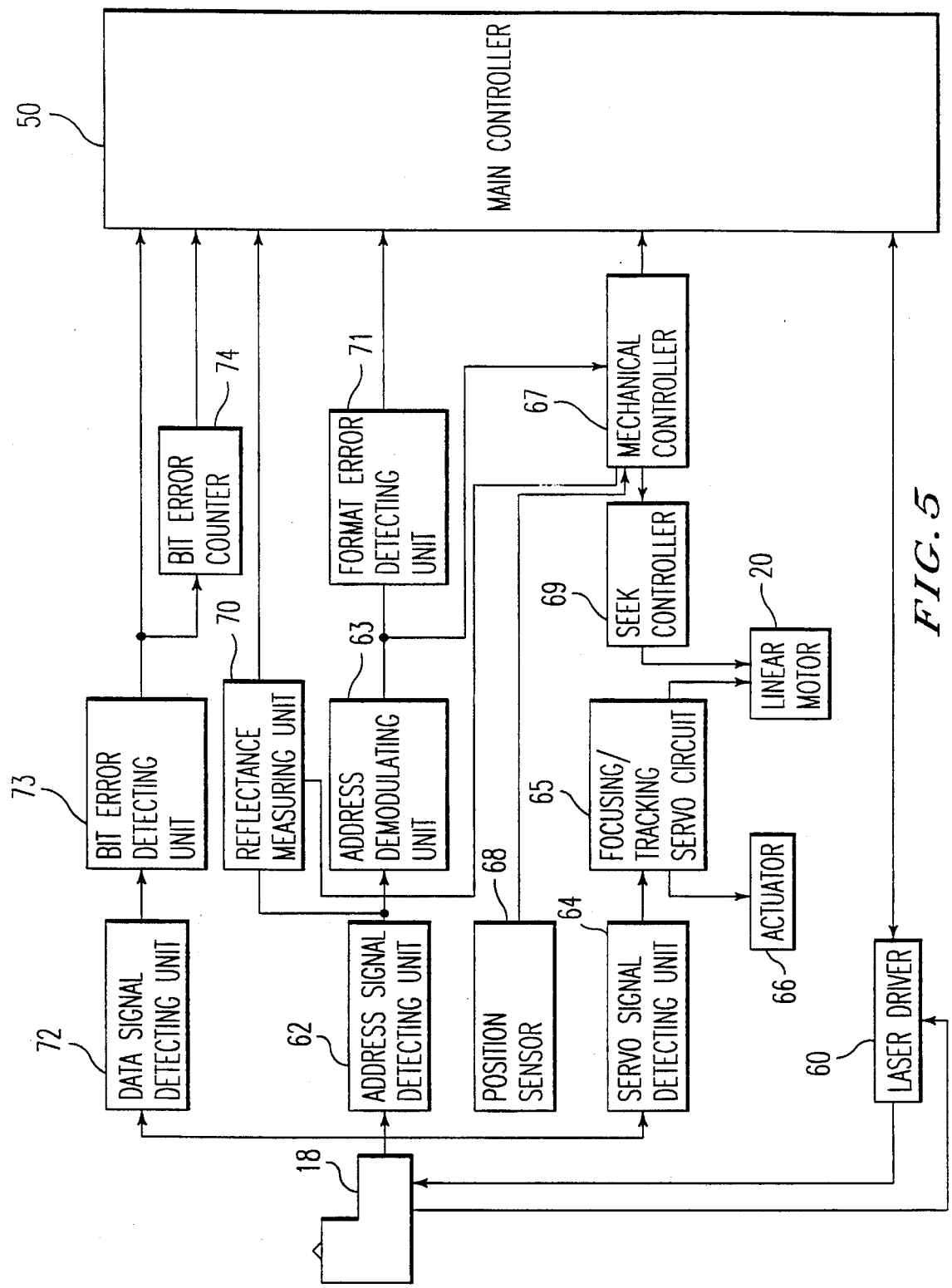
FIG. 5 is a functional block diagram of the write head control unit of the magneto-optical disk inspecting apparatus of FIG. 1.

FIGS. 3–5 show functional block diagrams of the magneto-optical disk inspecting apparatus according to this embodiment.

FIG. 3 diagrammatically shows the control of the magneto-optical disk inspecting apparatus, and the control of the inspecting system using a plurality of the magneto-optical disk inspecting apparatus. This inspecting system is generally controlled by a host computer (not shown) and includes a plurality of the magneto-optical disk inspecting apparatus (six apparatus in this embodiment) as a unit which is controlled by a unit controller 51.

Each magneto-optical disk inspecting apparatus includes a main controller 50 for Generally controlling the apparatus. The main controller 50 includes a tilt sensor 52 for detecting the presence and settling condition of a magneto-optical disk 10, a motor drive unit 54 for driving a spindle motor 12, write head control units 56 for controlling the write heads 16a, 16b, and read head control units 58 for controlling the read heads 18a, 18b.

The write heads control units 56 will be explained in good detail with reference to FIG. 4.

A laser driver 50 drives the laser source for each write head 16. The laser driver 60 turns on and off the laser beam source 30 in accordance with a detection signal from a detection signal generating unit 61 and with an intensity suitable for a writing operation corresponding to a power setting signal from the main controller unit 50. It is assumed for simplifying the explanation that the detection signal in this embodiment comprises [010101 . . . ] in which 0 and 1 alternately occur.

An address signal detecting unit 62 detects an address signal preset in each sector of the magneto-optical disk 10, based on a signal detected by the light detector 36 of the write head 16. This address signal is demodulated by an address demodulating unit 63 based on which is known a current position of the write head 16.

Based on the signal detected by the light detector 36 of the write head 16, a servo signal detecting unit 64 detects a servo signal. Based on the detected servo signal, a focussing/tracking servo circuit 65 controls an actuator 66 for driving the objective lens 35 vertically and horizontally.

A mechanical controller 67 is for controlling the linear motor 20 for driving the write head 16 and supplies a control signal to a seek controller 69, based on a position signal indicative of a position of the write head from a position sensor 68, and the address at which the write head is positioned from the address demodulating unit 63.

The servo signal from the focussing/tracking servo circuit 65 and a seek control signal from the seek controller 69 control the linear motor 20 to position the write head 16 on a proper track.

Each read head control unit 58 will be explained in detail with reference to FIG. 5. The common members of the read head control unit with the write head control unit 56 have the same reference numerals not to repeat their explanation.

A laser driver 60 drives the laser beam source 40 at an intensity suitable for a reading operation corresponding to a power setting signal from a main controller 50.

A reflectance measuring unit 70 measures the reflectance of the magneto-optical disk 10, based on a detected signal of the optical detector 47 of the read head, which is outputted by an address signal detecting unit 62. The reflectance measuring operation is conducted with the read head 19 positioned outside both outer and inner zones of the magneto-optical disk 10 by a mechanical controller A format error detecting unit 71 detects errors in the format part of each sector of the magneto-optical disk 10. In the format part, sector marks, address marks, addresses, etc. are pitted beforehand when the magneto-optical disk substrate is manufactured. The format error detecting unit 71 checks whether such format is correctly pitted.

A data signal detecting unit 72 detects the data magnetically recorded on the magneto-optical disk 10. In this embodiment, the data signal detecting unit 72 detects the inspection data signals written by the write head.

A bit error detecting unit 73 detects bit errors of the data signal detected by the data signal detecting unit 72. The unit 73 detects by the unit of a bit whether or not the inspection data signal is correctly recorded on the magneto-optical disk 10.

Figure 6:
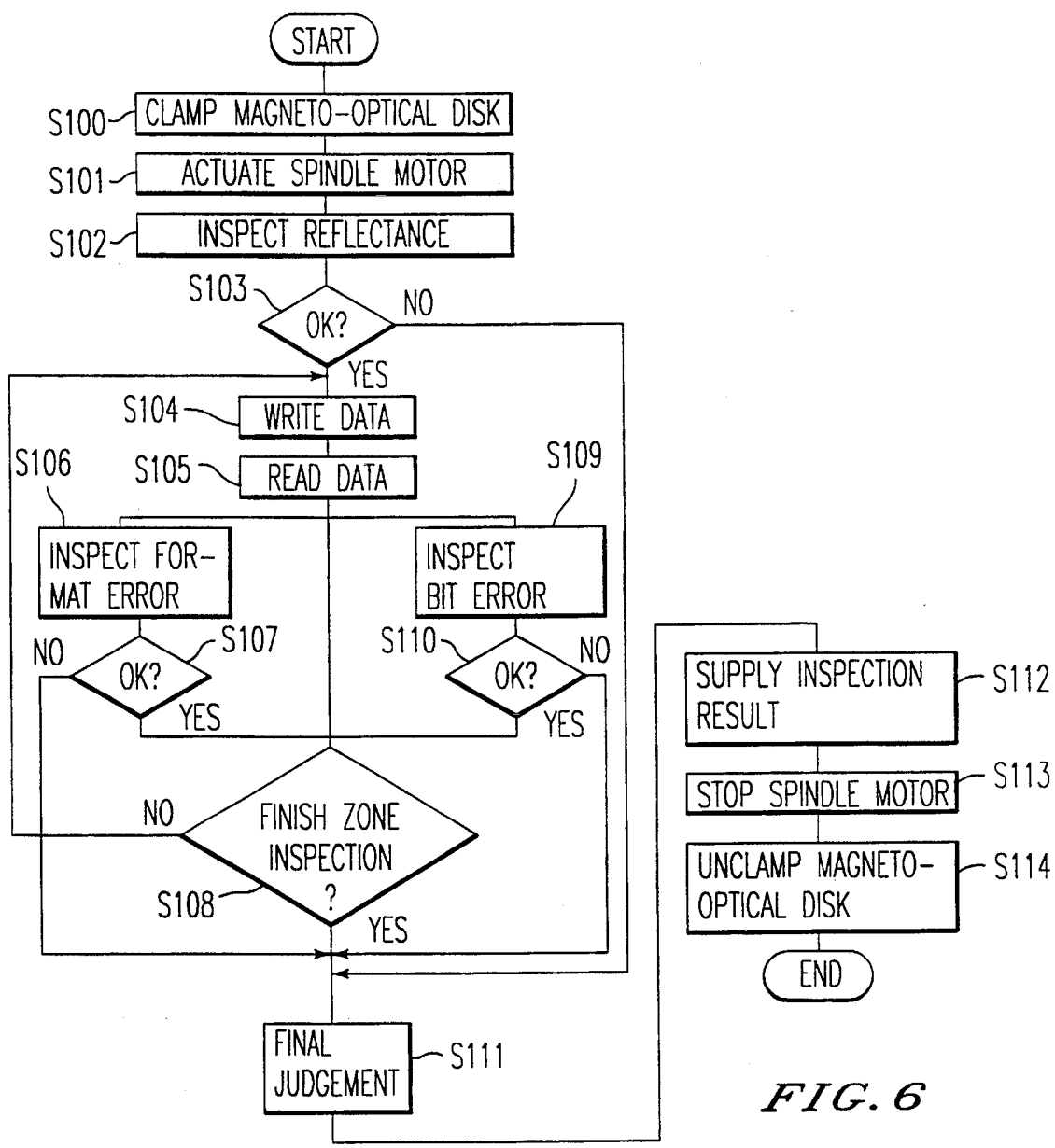
FIG. 6 is a flow chart of the inspecting method using the magneto-optical disk inspecting apparatus of FIG. 1.

A bit error counter 74 counts the bit errors detected by the bit error detecting unit Next, the magneto-optical disk inspecting method using the magneto-optical disk inspecting apparatus according to this embodiment will be explained with reference to the flow chart of FIG. 6.

Before a magneto-optical disk 10 is inspected by the magneto-optical disk inspecting apparatus, all the tracks of the disk 10 are erased to be initialized by its special magneto-optical disk initializing apparatus (not shown).

First, the magneto-optical disk 10 is mounted on the spindle of the spindle motor 12. The magneto-optical disk 10 is held by the clamper 14 (Step S100). At this time, the tilt sensor 52 detects whether or not the magneto-optical disk 10 is mounted properly.

Then, the spindle motor 12 is actuated to reach a required rotation rpm (Step S101). For the normal operation, the rotation rpm of the magneto-optical disk 10 is 1800 rpm, but it may be rotated at, e.g., 3600 rpm, or twice the normal rotation number, so as to finish the inspecting operation in a shorter time.

Subsequently, the reflectance is detected with the read heads 18 positioned outside the outermost recording zone of the magneto-optical disk 10 (Step S102). Then, it is judged whether a reflectance measured by the reflectance measuring unit 70 has reached a set value (Step S103). Unless the measured reflectance has reached the set value, Step S103 is immediately followed by Step S111 without the inspecting operations in the following steps. When the reflectance has reached the set value, Step S104 follows.

In Step S104, the write heads 16a, 16b write inspection data in the tracks sequentially from the respective outermost tracks of the inspection zones P, Q.

When the write heads have written inspection data in the respective outermost tracks, the reading heads 18a, 18b read these tracks with the inspection data written in, for the following inspecting operations (Step S105).

The format error detecting unit 71 inspect the format part for a format error (Step S106) to judge whether or not there is a significant error (Step S107). When a significant error is detected, Step S107 is immediately followed by Step S111 without the following inspecting operations. Unless there is a significant error, Step S107 is followed by S108.

Simultaneously with Step S106, the bit error detecting unit 73 inspects the inspection data signal for an error (Step S109) to judge whether or not there is a significant error (Step S110). When there is a significant error, Step S110 is immediately followed by Step S111. Unless there is a significant error, the next Step S108 follows.

Then, it is judged whether or not the inspections into the inspection zones P, Q have been finished (Step S108). Unless the inspections have been finished, immediately Step S104 follows to repeat Steps S104–S110. When the inspections into the inspection zones are finished, Step S111 follows to finally judge the inspection results.

In Step S111, it is judged whether or not the magneto-optical disk under inspection is proper. The magneto-optical disk is judged here in Step S111 to be improper when the reflectance is judged not to have reached the set value in Step S103, when it is judged in Step S107 that there is a significant error and/or when it is judged in Step S110 that there is a significant bit error. In cases other than the above, it is finally judged whether or not the magneto-optical disk is improper, finally taking into consideration the level of a formal error and the level of an bit error. For example, when a counted value of the bit error counter 74 has reached a preset value, the magneto-optical disk is judged "improper".

Next, the main controller 50 supplies the judgement result made in Step S111 to the host computer through the unit controller 51 (Step S112).

Then, the spindle motor 12 is stopped (Step S113), then the clamper 14 is unclamped to dismount the magneto-optical disk 10 (Step S114), and the inspection on one magneto-optical disk is completed.

A magneto-optical disk which is judged "proper" when the inspection is completed is initialized by the special magneto-optical disk initializing apparatus (not shown) to be a finished product.

In this embodiment, where the write heads for writing only and the read heads for reading only are separate, the structures of the heads can be simple. Further in this embodiment, the respective write heads are mated with the respective read heads to form two pair of the write and the read heads so that the recording surface of a magneto-optical disk is divided in two zones to be inspected respectively by the two pairs of the write heads and the read heads so that the inspection period of time can be shortened.

The magneto-optical disk inspecting apparatus according to a second embodiment of this invention will be explained with reference to FIGS. 7–10. The common members of the second embodiment with the first embodiment have the same reference numerals not to repeat their explanation.

In the first embodiment, a magneto-optical disk has to be initialized by a special magneto-optical disk initializing apparatus before and after the magneto-optical disk is inspected. But the magneto-optical disk inspecting apparatus according to the second embodiment is characterized in that the initializing operations before and after an inspecting operation are conducted simultaneously.

FIGS. 7(a) and (b) are plane and sectional views of a major part of the magneto-optical disk inspecting apparatus according to the second embodiment.

The magneto-optical disk inspecting apparatus according to this embodiment includes two erase heads 80a, 80b in addition to a write head 16 and a read head 18. That is, the erase head 80a, the write head 16, the read head 18 and the erase head 80b are so arranged that they are to be positioned in the above described sequential order along the periphery of a magneto-optical disk 10 to be inspected. Magnet holding portions 14a, 14b, 14c, 14d are extended from a clamper 14, and permanent magnets 22a, 22b, 22d are provided above the erase head 80a, the write head 16, the erase head 80b except the read head 18. The direction of the magnetic field generated by the permanent magnets 22a, 22d above the erase heads 80a, 80b is opposite to that generated by the permanent magnet 22b above the write head 16. No permanent magnet is provided above the read head 18 which requires no magnetic field.

Here it is assumed that an inspecting operation is started on the outermost track of the magneto-optical disk 10. First the erase head 80a initializes the magneto-optical disk, then the write head 16 writes inspection data, subsequently the read head 18 inspects, and finally the erase head 80b initializes the magneto-optical disk to return it to the initial state. That is, the magneto-optical disk 10 which has not yet been initialized is inspected by the magneto-optical disk inspecting apparatus according to this embodiment and will have been initialized at the end of the inspecting operation. The magneto-optical disk 10 will be immediately prepared for delivery.

The erase head 80 has the same structure as the write heads as shown in FIG. 2(a). But they are different from each other in the directions of the permanent magnets 22 above the upper side of the magneto-optical disk.

Figure 8:
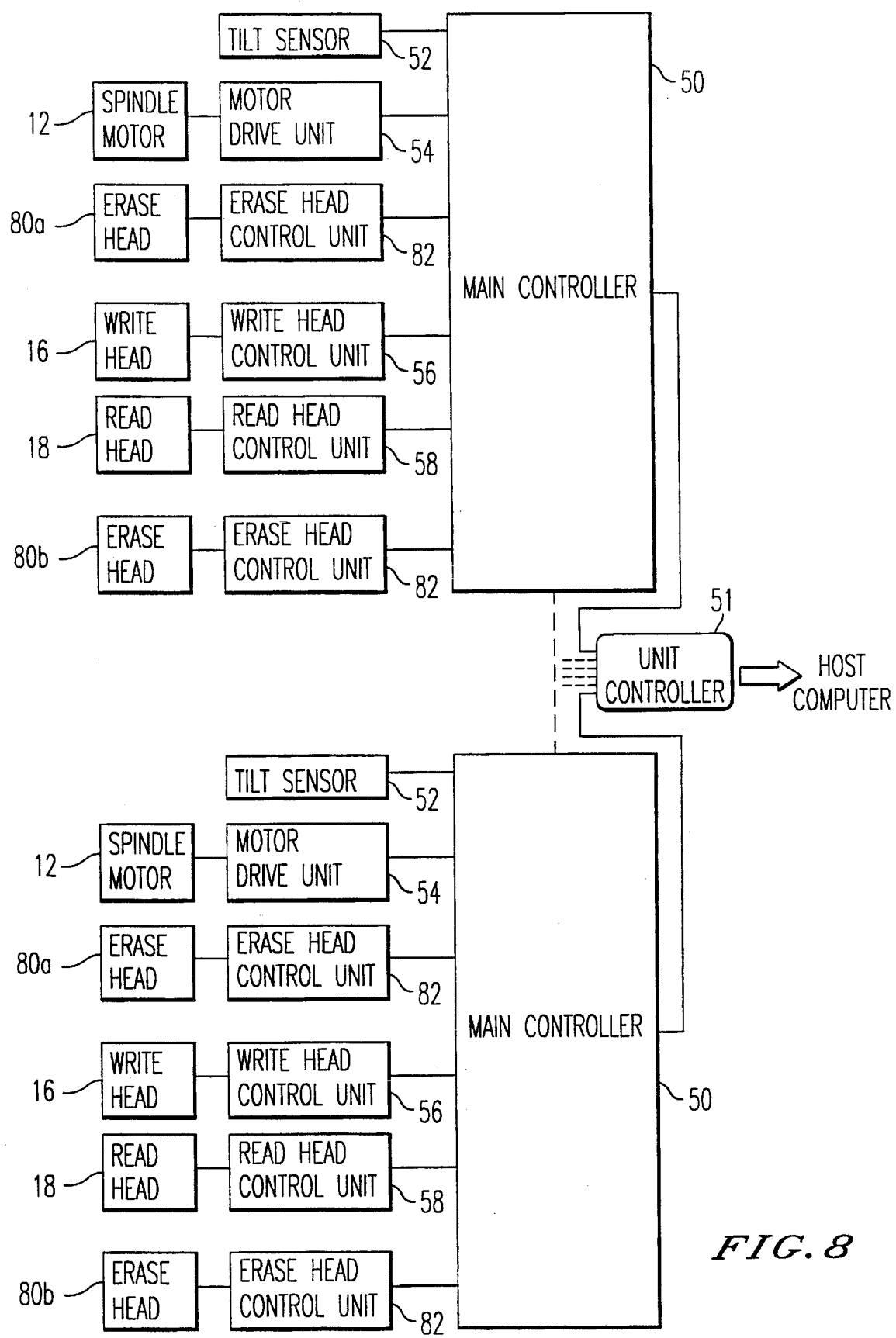
FIG. 8 is a functional block diagram of the magneto-optical disk inspecting apparatus of FIG. 7.

The magneto-optical disk inspecting apparatus according to this embodiment differs from the first embodiment in that in this embodiment, as shown in the functional block diagram of FIG. 8, each erase head 80b is controlled by an erase head control unit 82.

Figure 9:
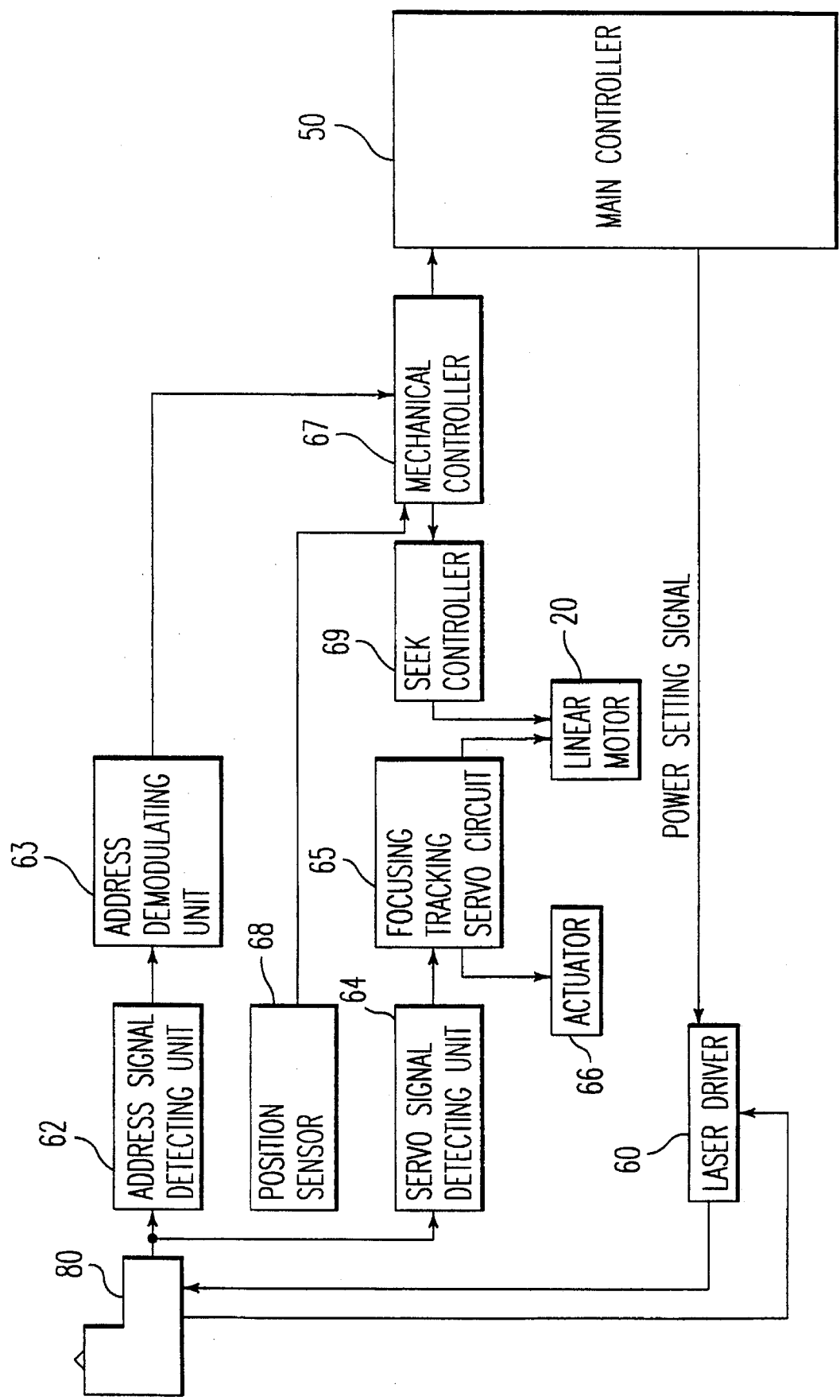
FIG. 9 is a functional block diagram of the erase head control unit of the magneto-optical disk inspecting apparatus of FIG. 7.

The erase head control unit 82 is shown in FIG. 9 in detail. The erase head control unit 82 has substantially the same structure as the write head control unit 56. But the former does not include the inspection signal Generating unit 81. This is because in the erasing head 80 a laser beam is continuously emitted to magnetize the entire surface of the magneto-optical disk 10 in one direction. The erase head control unit is not explained any further, because except that the erase head control unit 82 does not include the inspection Generating unit 61, it is the same as the write head control unit 56.

Figure 10:
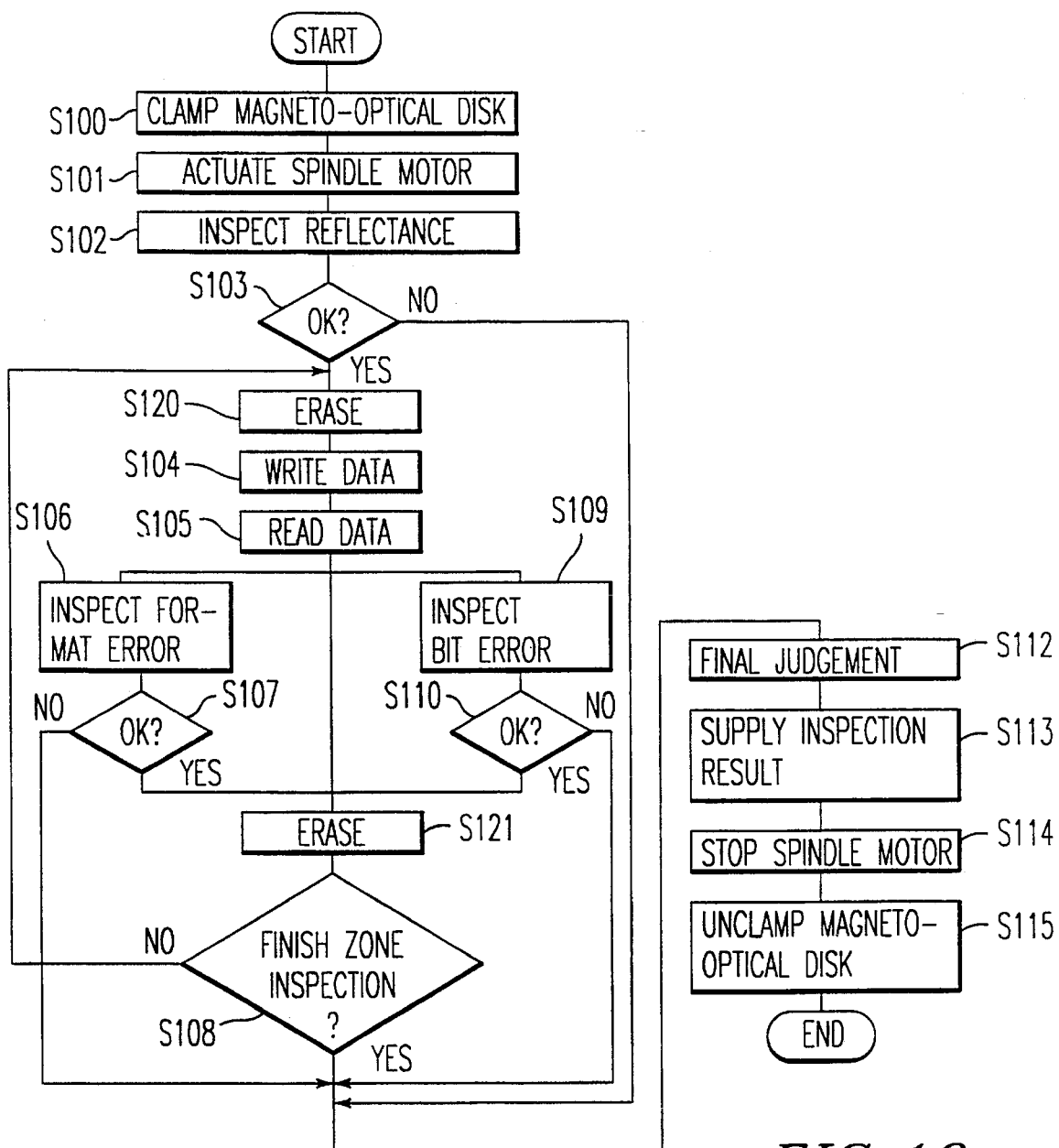
FIG. 10 is a flow chart of the inspecting method of the magneto-optical disk inspecting apparatus of FIG. 7.

Next, the magneto-optical disk inspecting method using The magneto-optical disk inspecting apparatus according to this embodiment will be explained below with reference to the flow chart of FIG. 10.

This method differs from The method using the first embodiment in That in this method the tracks to be inspected are erased by the erase head 80a (Step S120) before data are written in Step S104, and the inspected tracks are erased by the erase head 80b (Step S121) after format errors are judged Step S107 and bit errors are judged in Step S110. That is, in this embodiment, the magneto-optical disk 10 to be inspected is erased by the unit of tracks, then inspection data are written by the write head 18, next the inspection is made by the read head 18, and finally the disk is initialized by the erase head 80b. Since this method is the same as the method using the first embodiment in the other steps, the explanation of those steps is not repeated.

In this embodiment, in which the write head for writing only, the read head for reading only, and the erase heads are separately provided, the initialization before an inspection and that after the inspection can be simultaneously conducted. This embodiment requires no special magneto-optical disk initializing apparatus.

This inventions are not limited to the above described embodiments but cover various modifications.

For example, in the first embodiment two pairs of the write head and the read head are provided so that the recording surface of a magneto-optical disk can be divided in two zones to be inspected. But a plurality of pairs of the write head and the read head may be provided so that the recording surface of a magneto-optical disk is divided in a plurality of zones to be inspected. The latter case can further increase the inspection speed.

It is also possible that two or more pairs of the write head, read head and the two erase heads used in the second embodiment are provided so that the recording surface of a magneto-optical disk can be divided in more zones to be inspected.

In the first and the second embodiments, the bit error detecting unit detects bit errors of a magneto-optical disk, but also errors may be detected by the unit of a byte. It is also possible to detect errors by the unit of a sector.

It is possible that when an error is detected, the information of the position of the error is recorded in a preset track of a magneto-optical disk.

What is claimed is:

1. A magneto-optical disk writing and reading method for writing on and reading from a magneto-optical disk for determining whether polarization defects exist in the disk, comprising the steps of:

rotating the disk;

concurrently writing data from a plurality of write heads onto each one of a plurality of concentric annular zones of the disk, wherein each write head writes data onto a corresponding one of the plurality of concentric annular zones;

concurrently reading data with a plurality of read heads from, respectively, each of the plurality of concentric annular zones, wherein each read head reads data from a corresponding one of the plurality of concentric annular zones by 1) generating a laser beam with a laser beam source
2) collimating the laser beam with a collimator lens
3) shaping the laser beam with a shaping prism
4) linearly polarizing the laser beam by passing it through a linear polarizer
5) passing the linearly polarized laser beam that passed through the linear polarizer through a polarizing beam splitter
6) focusing the linearly polarized laser beam that passed through the polarizing beam splitter at a point on said corresponding one of the plurality of concentric annular zones, whereat the linearly polarized laser beam which has passed through the polarizing beam splitter is reflected to form a polarized reflected beam
7) passing the polarized reflected beam through the objective lens
8) splitting the polarized reflected beam that is passed through the objective lens with the polarizing beam splitter into a first reflected portion and a second transmitted portion
9) passing part of the first reflected portion through an analyzer and
10) detecting the intensity of light from the part of the first reflected portion that passed through the analyzer, wherein said intensity of light that passed through the analyzer corresponds to a direction of magnetization of said disk in said corresponding one of the plurality of concentric annular zones;

independently moving each write head and each read head diametrically with respect to the disk;

determining whether or not the optical disk was written on with a write signal, by comparing a read signal read from the optical disk by a selected read head with a write signal supplied to that portion of the optical disk which was read by the selected read head; and wherein when said step of determining determines that the optical disk was not written on, a polarization defect exists at said portion of the optical disk which was read by said selected read head.

2. A magneto-optical disk writing and reading apparatus for writing on and reading from a magneto-optical disk for determining whether polarization defects exist in the disk, comprising:

a plurality of write heads and a plurality of an equal number of read heads;

means for independently driving each of the heads, comprising means for writing with the write heads and means for reading with the read heads, so that each head may perform its respective write or read function;

means for independently and diametrically moving each of the heads relative to the disk;

means for concurrently writing from a plurality of writing heads, data onto the disk;

means for concurrently reading with a plurality of read heads, data from the disk, each read head comprising
1) means for generating a laser beam from a laser beam source,
2) means for collimating the laser beam with a collimator lens,
3) means for shaping the laser beam with a shaping prism,
4) means for linearly polarizing the laser beam by passing it through a linear polarizer,
5) a polarizing beam splitter in the path of the laser beam after the laser beam passed through the linear polarizer,
6) means for focusing the linearly polarized laser beam that passed through the polarizing beam splitter at a point on said corresponding one of the plurality of concentric annular zones, whereat the linearly polarized laser beam which has passed through the polarizing beam splitter is reflected to form a polarized reflected beam,
7) wherein the polarized reflected beam passes through the objective lens,
8) wherein, after the polarized reflected beam passes through the objective lens it is split by the polarizing beam splitter into a first reflected portion and a second transmitted portion,
9) means, comprising an analyzer, for analyzing the first reflected portion, wherein a part of the first reflected portion passes through the analyzer, and
10) means for detecting the intensity of light from the part of the first reflected portion that passed through the analyzer and means for generating a read signal corresponding to said intensity of light from the part of the first reflected portion, wherein said intensity of light that passed through the analyzer corresponds to a direction of magnetization of said disk in said corresponding one of the plurality of concentric annular zones;

means for determining whether or not the optical disk was written on by writing signals, comprising means for comparing a read signal read from the optical disk by a selected read head with a write signal supplied to that portion of the optical disk from which the read signal was read; and wherein when said means for determining determines that the optical disk was not written on, a polarization defect exists at said portion of the optical disk which was read by said selected read head.

3. An apparatus according to claim 2, further comprising:

a plurality of permanent magnets which are disposed so that each permanent magnet of the plurality of permanent magnets
(1) opposes only one of a plurality of distinct regions of a first major surface of the disk and
(2) each one of said plurality of write heads opposes a region of the second major surface of the disk that opposes one of the plurality of distinct regions of the first major surface, and wherein each permanent magnet applies a magnetic field substantially perpendicular to the second major surface of the disk in the corresponding one of the plurality of distinct regions of the disk which it opposes.

4. A magneto-optical disk writing and reading apparatus for writing on and reading from a magneto-optical disk for determining whether polarization defects exist in the disk, comprising:

a plurality of write heads and a plurality of an equal number of read heads;

means for independently driving each of the heads, comprising means for writing with the write heads and means for reading with the read heads, so that each head may perform its respective write or read function;

means for independently and diametrically moving each of the heads relative to the disk;

means for concurrently writing from a plurality of writing heads, data onto the disk;

means for concurrently reading with a plurality of read heads, data from the disk;

wherein each of said plurality of read heads comprises
(1) means for generating a linearly polarized optical beam,
(2) means for focusing the linearly polarized optical beam onto said disk, wherein said linearly polarized optical beam is reflected forming a reflected beam, and
(3) means for measuring polarization of the reflected beam;

means for determining whether or not the optical disk was written on by writing signals, comprising means for comparing a read signal read from a location on the optical disk by a selected one of the plurality of read heads with a write signal supplied to said location of the optical disk from which the read signal was read; and wherein when said means for determining determines that optical disk was not written on, a polarization defect exists at said portion of the optical disk which was read by said selected read head.

5. A magneto-optical disk writing and reading method for writing on and reading from a magneto-optical disk for determining whether polarization defects exist in the disk, comprising the steps of:

rotating the disk;

concurrently writing data from a plurality of write heads onto each one of a plurality of concentric annular zones of the disk, wherein each write head writes data onto a corresponding one of the plurality of concentric annular zones;

concurrently reading data with a plurality of read heads from, respectively, each of the plurality of concentric annular zones, wherein each read head reads data from a corresponding one of the plurality of concentric annular zones by (1) generating a linearly polarized optical beam, (2) focusing the linearly polarized optical beam onto said disk, wherein said linearly polarized optical beam is reflected forming a reflected optical beam, and (3) measuring polarization of the reflected optical beam;

determining whether or not the optical disk was written on with a writing signal, by comparing a read signal read from the optical disk by a selected read head with a write signal supplied to that portion of the optical disk which was read by the selected read head; and wherein when said step of determining determines that optical disk was not written on, a polarization defect exists at said portion of the optical disk which was read by said selected read head.

* * * * *